US005560731A

United States Patent [19]

Kronenberg

[11] Patent Number: 5,560,731

[45] **Date of Patent: * Oct. 1, 1996**

[54] PLUG CONNECTOR FOR HOLLOW SECTIONS

[75] Inventor: Max Kronenberg, Solingen, Germany

[73] Assignee: Helmut Lingemann, Wuppertal, Germany

[ * ] Notice: The term of this patent shall not extend beyond the expiration date of Pat. No. 5,209,599.

[21] Appl. No.: 238,830

[22] Filed: May 6, 1994

[30] Foreign Application Priority Data

May 10, 1993 [DE] Germany .......................... 93 07 089 U
Oct. 14, 1993 [DE] Germany .......................... 43 35 039.9

[51] Int. Cl.$^6$ .................................................. F16B 39/22

[52] U.S. Cl. ....................... 403/298; 403/292; 403/405.1; 411/339; 411/510; 411/913

[58] Field of Search ............................ 411/508–510, 339, 411/913; 403/292, 298, 309, 314, 405.1, 409.1, 280; 446/120, 121

[56] References Cited

U.S. PATENT DOCUMENTS

| | | | |
|---|---|---|---|
| 1,051,427 | 1/1913 | McCluskey | 403/292 |
| 1,354,549 | 10/1920 | Gilmer | 403/280 |
| 2,236,926 | 4/1941 | Surface | 403/280 |
| 2,996,159 | 8/1961 | Casebolt | 403/280 |
| 3,325,585 | 6/1967 | Brenneman | 403/280 |
| 3,352,191 | 11/1967 | Crawford | 411/913 |
| 3,643,989 | 2/1972 | Sattler | 403/405.1 |
| 4,055,031 | 10/1977 | Okawa | 52/172 |
| 4,373,829 | 2/1983 | Braxell | 403/292 |
| 5,022,777 | 6/1991 | Kolvites | 403/292 |
| 5,127,762 | 7/1992 | Havlovitz | 403/298 |
| 5,209,599 | 5/1993 | Kronenberg | 403/292 |

*Primary Examiner*—Steven N. Meyers
*Assistant Examiner*—Gary Estremsky
*Attorney, Agent, or Firm*—Amster, Rothstein & Ebenstein

[57] ABSTRACT

A plug connector for making a connection joint between an axially aligned pair of hollow spacer profiles of insulating glass panes is configured as an essentially U-shape cross section with a center web and a pair of side webs extending from the center web to define with the center web a cavity in the plug connector. The plug connector is characterized by a bottom plate extending between the side webs for closing the cavity in and only in the region of the connection joint between the spacer profiles. Preferably the bottom plate consists of one or two lobes bent at an angle from the side webs and pointing towards an inner side of the spacer profiles. The plug connector preferably has siccative disposed in the cavity.

3 Claims, 3 Drawing Sheets

FIG. 3
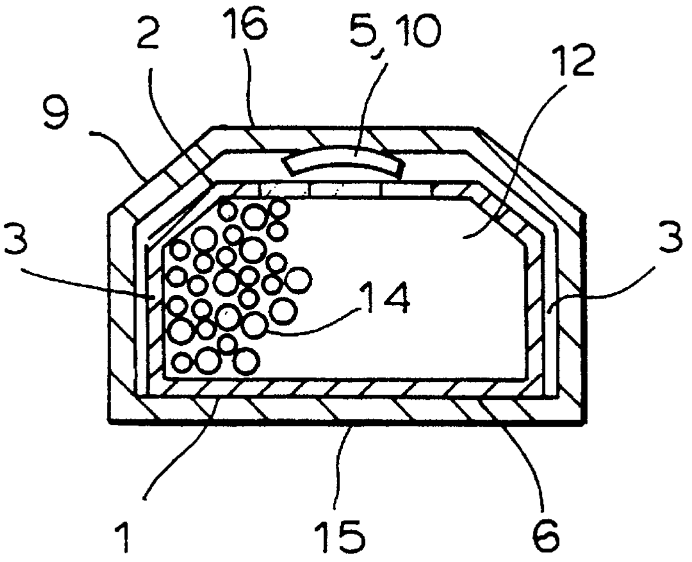
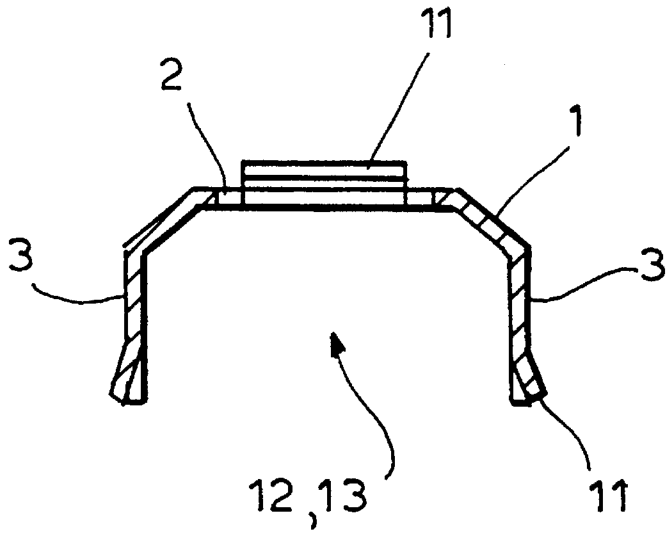
FIG. 4

PLUG CONNECTOR FOR HOLLOW SECTIONS

BACKGROUND OF THE INVENTION

The invention relates to a plug connector for hollow sections of spacer frames for insulated glass panes with the features in the preamble of the main claim.

Such a plug connector is known from EP 0 283 689 and from DE-OS 34 08 600. It is made as a stamped and bent part of U-shaped cross section of steel sheet and has several resilient retaining elements for firm fit and tolerance compensation in the hollow sections.

From DE-GM 90 10 884 another plug connector is known, which is fixed in the hollow sections by positive unions. This purpose is served by rivets, mortise joints of the hollow section wall, or other retaining elements which engage positively in center web openings of the plug connector.

It has been found in the practice that, depending on the material and mode of manufacture, the hollow section tolerances may vary considerably, at equal basic sizes of the sections, and this may lead to problems with the fit of the plug connectors and the junction of the hollow sections.

SUMMARY OF THE INVENTION

It is an object of the present invention to show a possibility for better handling of tolerance problems.

The invention solves this problem with the characteristics of the main claim.

The plug connector according to the invention has at least in the region of the junction of the hollow sections a bottom plate which bridges the junction. Due to this, the plug connector has in the region of the junction an essentially continuous wall. The siccative that may be contained in the interior of the plug connector is prevented by the bottom plate from escaping through the gap resulting at the junction due to tolerance problems. In addition, the bottom plate backs the gap, so that it is not conspicuous to the eye.

The plug connector of the invention does not necessarily take up the manufacturing tolerances of the hollow sections better, but it substantially diminishes the consequences thereof. The plug connector need not fit absolutely firmly in the hollow sections. Also, contrary to earlier efforts in the prior art, a gap may form at the junction of the hollow sections. But because of the bottom plate, the gap has no adverse consequences.

For the tolerance uptake and firm fit of the plug connector in the hollow sections it is advantageous if the plug connector is adapted in its cross section to the hollow section form and has resilient retaining elements at the center web and at the side webs. The resilient retaining elements also provide for the tolerance compensation. Alternatively or additionally there may be created a positive union between the plug connector and the hollow sections by mortise joints or other connecting or retaining elements.

For the firm fit it is further advantageous if the center web of the plug connector points toward the exterior of the frame and possibly also abuts against the roof of the hollow sections. The bottom plate is then located on the inner side of the frame and prevents escape of the siccative at the imperiled junction.

In the areas adjacent to the bottom plate the plug connector has its normal unilaterally open U cross section form which permits contact of the siccative with the hollow section wall, preferably on the inner side of the frame. Owing to this, the siccative is effective over the full length of the plug connector except for the narrow bottom plate region.

It is advisable to make the bottom plate as narrow as possible, in order to cover just only the junction. To be able to position the plug connector in the hollow sections with the proper precision, one or more stops are provided. These are preferably formed as resilient abutment lugs, which after the plugging on of the hollow sections disappear in the interior thereof.

Additional advantageous embodiments of the invention are indicated in the sub-claims.

BRIEF DESCRIPTION OF THE DRAWING

The invention is illustrated in the drawings by way of example and schematically. Specifically.

FIG. 3: A transverse section through the plug connector with hollow sections along sectional line III—III of FIG. 2;

FIG. 4: A transverse section through a plug connector along sectional line IV—IV of FIG. 1;

FIGS. 1 to 4 show a plug connector (1) for hollow sections (9) of spacer frames for insulated glass panes. The hollow sections (9) are filled with a siccative (14) which through perforations, slots or the like on the inner side (15) of the frame communicates with the gas between the insulated glass panes (not shown) and keeps the gas dry.

Figure 2:
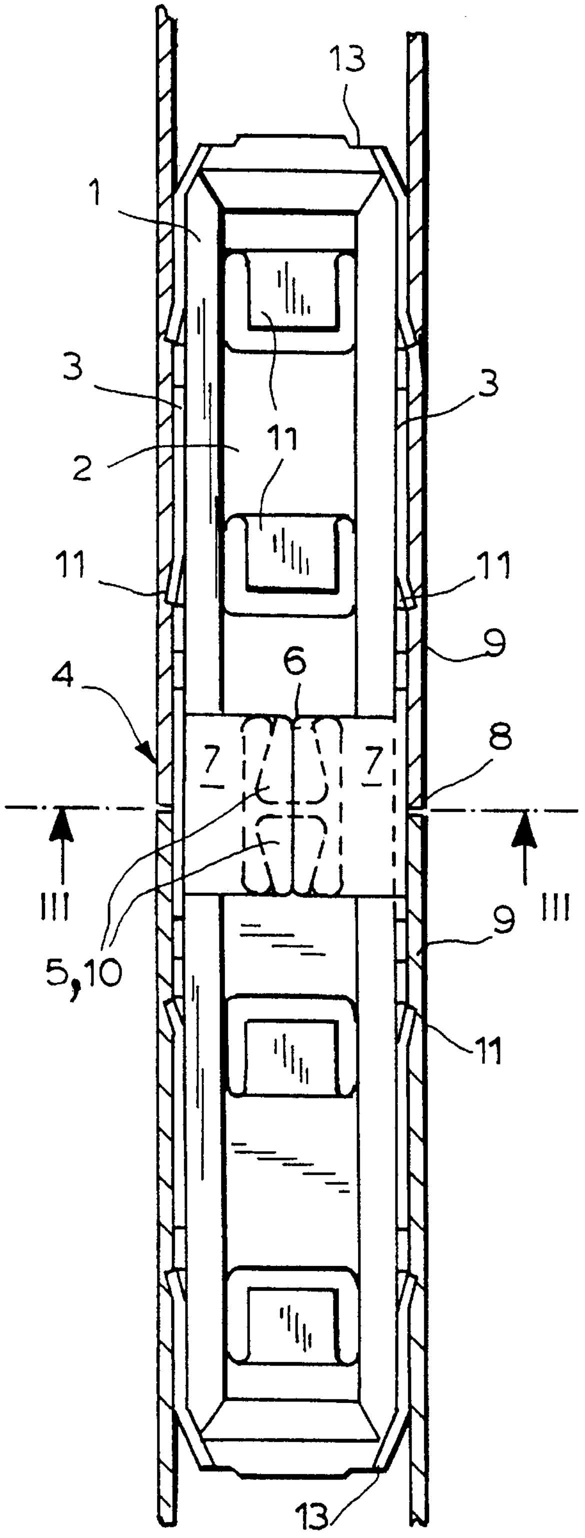
FIG. 2: A plug connector with spring lugs in hollow sections in partially sectional top view along arrow II of FIG. 1.
Figure 1:
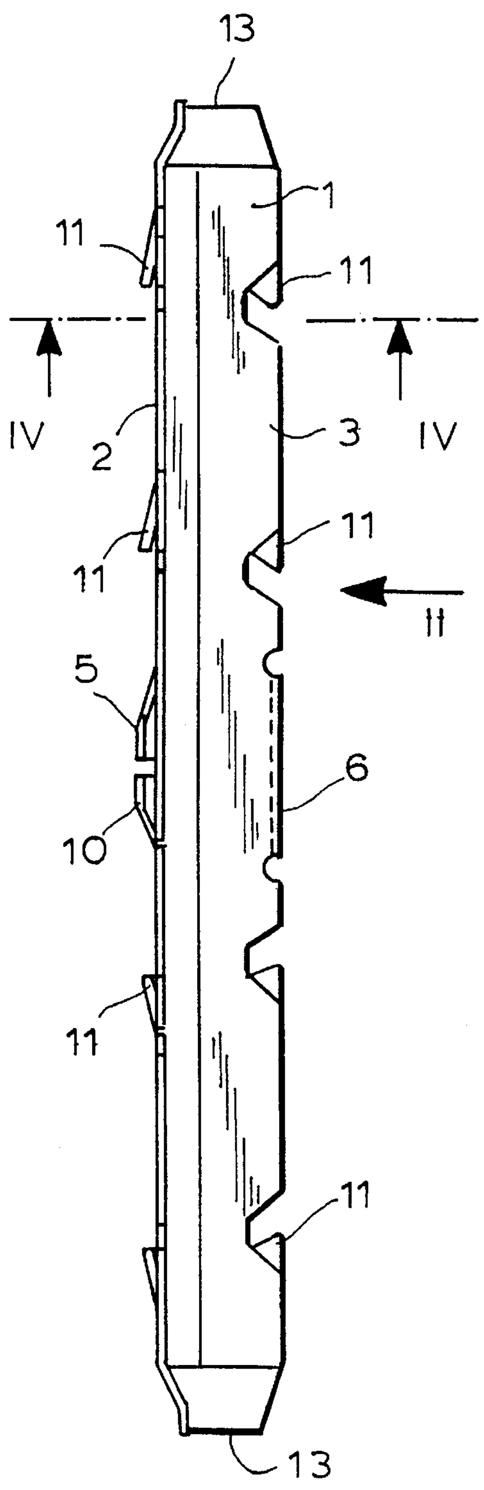
FIG. 1 shows: A plug connector in side view.

The hollow sections (9) may be manufactured in different ways. They consist for example of extruded light metal sections, rolled or roll-bent steel or light-metal sections or the like. In accordance with the production method, there result for equal outside dimensions of the hollow sections (9) different tolerances for the inside size.

Preferably the plug connector (1) is formed as a straight plug connector and has essentially a U-shaped cross section (cf. FIG. 4). In the embodiment example of FIGS. 1 to 4 it has several retaining elements (11) at the center web (2) and/or the side webs (3) of the U-shape. The retaining elements (11) are formed as resilient and bent-out lugs which claw into the inside walls of the slipped-on hollow sections (9) and oppose extraction of the plug connector (1).

In its cross-sectional form the plug connector (1) is adapted to the inside form of the hollow sections (9). By their spring excursion the retaining elements (11) compensate the inside tolerances of the hollow sections (9). In the preferred embodiment example the plug connector (1) is made as a stamped and bent part of metal, preferably steel sheet. The retaining elements (11) are here formed as retaining lugs punched free and bent out. In the center web (2) four lobe-shaped retaining lugs are punched out and bent upward against the direction of extraction. The retaining lugs (11) at the side webs are formed as free-cut triangular lobes bent obliquely outward at the web edges.

In the region of the junction (4) of the hollow sections (9), the plug connector (1) has a bottom plate (6). Normally this is at the same time the center in the longitudinal axis of the plug connector (1). The bottom plate closes the cavity (12) in the plug connector (1) at the bottom. As FIG. 2 illustrates, the bottom plate (6) bridges the junction (4) and any gap (8) that may be forming there between the hollow sections (9). The width of the bottom plate (6) is preferably chosen just large enough for the junction (4) or respectively the gap (8) to be securely covered up. Preferably the bottom plate (6) has a width of about 5 to 10 mm. It may, however, be either wider or narrower.

In the preferred form of realization of the plug connector (1) has a stamped and bent part, the bottom plate (6) consists of one or two lobes (7) which start from the side webs (3) and are bent back horizontally. In the preferred form of realization they are two lobes (7) abutting flush against each other at the center. Alternatively it may be a single lobe (7) joined only to one side web (3) and abutting flush at the opposite side web (3). The plug connector (1) may also be designed differently, for example as a plastic section, the bottom plate (6) being integrally molded on, in particular by injection molding. Depending on the design and form of the plug connector (1) there are still other possibilities of manufacture for the bottom plate (6).

Preferably the plug connector (1) is installed in the hollow sections (9) so that the center web (2) points to the outer side (16) of the frame. The bottom plate (6) then points to the inner side (15) of the frame. Preferably the bottom plate (6) is flat and abuts flat against the bottom of the hollow sections (9). On either side of the bottom plate (6) the plug connector (1) has again its normal, downwardly open U-form. In the preferred embodiment example the plug connector (1) is filled with siccative (14). On either side of the bottom plate (6) the granulated siccative (14) can come in contact with the hollow sections (9) on the inner side (15) of the frame and communicate through perforations, slots or the like in the bottom of the section with the gas between the insulated glass panes. At the junction (4) the bottom plate (6) covers the gap (8) and prevents escape of the siccative (14) at a possibly forming gap (8). For exact positioning of the plug connector (1) in the slipped-on hollow sections (9) one or more stops (5) are arranged at the junction (4). In the preferred embodiment example they are resilient stops (5) which disappear as the hollow sections (9) are being slipped on. In the embodiment example shown, they consist of two stop lugs (10) flexed out resiliently from the center web (2), which lugs face each other, their ends being close together and opposite each other. Alternatively they may be fixed rib-like stops. Stops may be provided also at the side webs. For manufacturing reasons, one stop (5) at the center web (2) is advisable for the preferred form of realization with bent-back lobes (7).

As FIGS. 2 and 4 illustrate, the plug connector (1) may have open end faces (13), through which the siccative (14) can pass from the hollow sections (9) into the cavity (12) of the plug connector (1) and flow through. Alternatively the plug connector (1) may have closed end faces, which prevent access of siccative. The bottom plate (6) then serves as visual covering for the gap (8). To this end it is advisable to make the plug connector (1) the same color as the hollow sections (9). The bottom plate (6) also seals the junction (4) at least partially against the fusion [sic, read: diffusion] phenomena. In addition it provides for easier gripping and handling of the plug connector (1).

Figure 5:
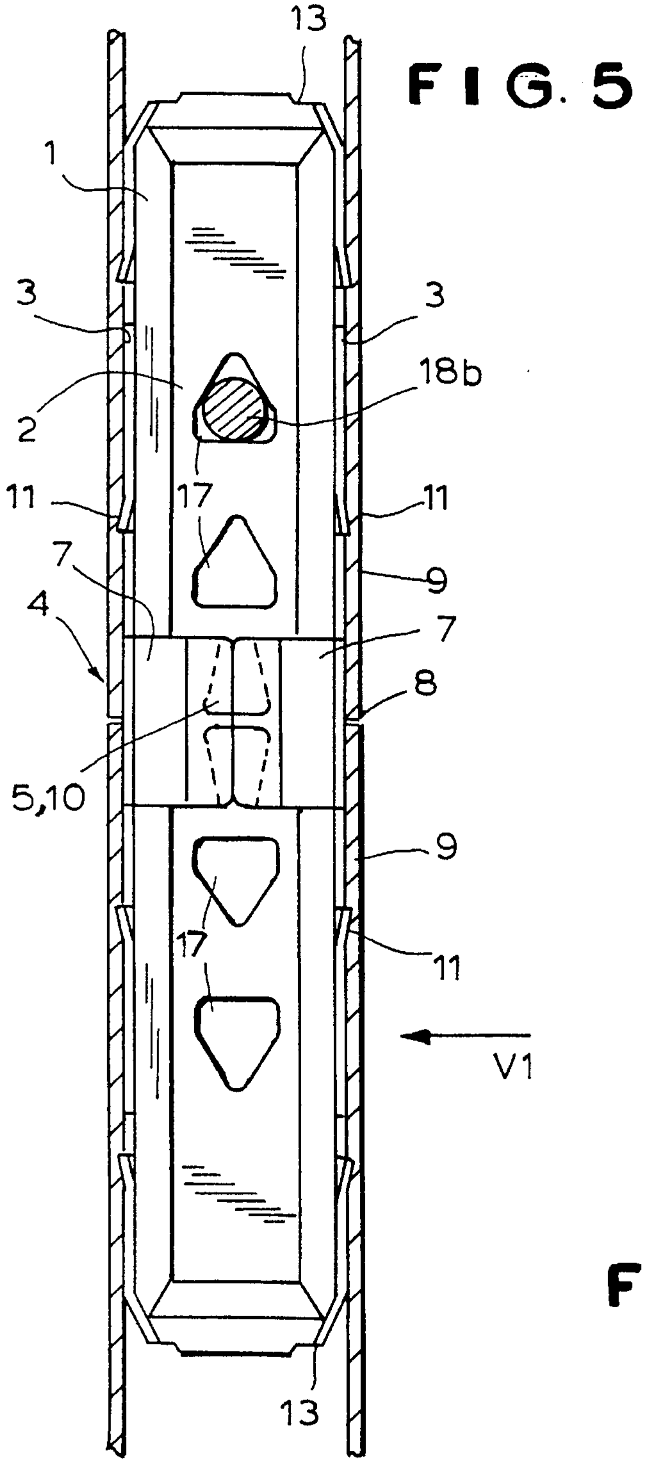
FIG. 5: A plug connector with triangular openings in hollow sections in partially sectional top view.
Figure 6:
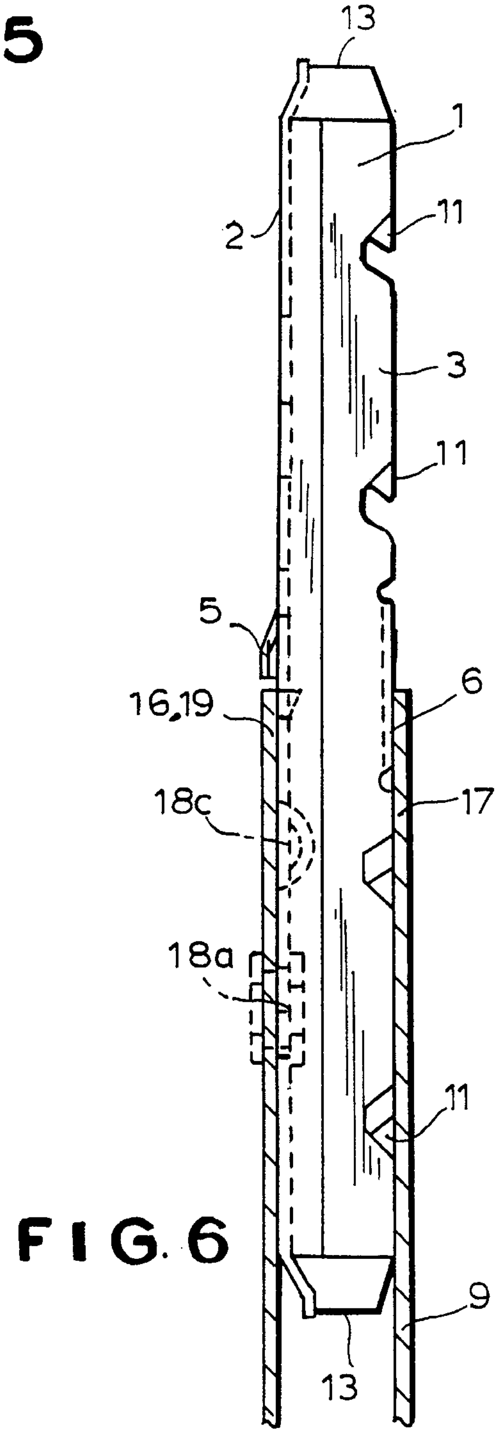
FIG. 6: A partially sectional side view as seen in the direction of arrow VI of FIG. 5.

FIGS. 5 and 6 show a variant of the plug connector (1) of FIGS. 1 to 4. The plug connector (1) has at the center web (2) to either side of the center two openings (17), preferably of triangular form. The openings (17) are formed as wall breaches and serve for the positive connection of the plug connectors (1) with the slipped-on hollow sections (9). A connecting element (18) can engage into the openings (17) from the outside. It passes through the openings (17) and protrudes into the cavity (12) of the plug connector (1). As FIG. 5 illustrates in the left half, the connecting element (18) may consist for example of a rivet, a protrusion from the hollow section wall, or the like.

The triangular form of the openings (17) is chosen so that at both plug connector halves the triangles are oriented with the base toward the center of the plug connector (1) and with their apex toward the adjacent end face. Upon the formation of a protrusion of the hollow section wall there occurs due to the triangular form a tensioning effect which pulls the plug connector (1) into the hollow sections (9) and closes the hollow sections (9) at the junction (4) as tightly as possible. Instead of the triangular form, the openings (17) may alternatively have any other suitable form.

In the form of realization of FIGS. 5 and 6, the openings (17) replace the resilient retaining lugs (11) at the center web (2) in the example of FIGS. 1 to 4. The retaining lugs (11) at the side webs (3) can stay. Present also are the stops (5) or respectively the resilient abutment lugs (10) at the center web (2). As a modification of the shown form of realization, a combination of openings (17) and retaining lugs (11) at the center web (2) may be used.

For the positive union it is useful if the plug connector (1) is adapted in its cross section to the inside form of the hollow sections (9) to a large extent and has its center web (2) arranged as close as possible to the roof (19) of the hollow sections (9) or respectively the outer side (16) of the frame. Any tolerances can be taken up by the connecting elements (18), in particular the mortise joint of the hollow section wall. By the mortise joint with its bottom plate (6), the plug connector (1) is pressed tightly against the inner side (15) of the frame at the junction (4).

LIST OF REFERENCE SYMBOLS

1 Plug connector
2 Center web
3 Side web
4 Junction
5 Stop
6 Bottom plate
7 Lobe
8 Gap
9 Hollow section
10 Abutment lug
11 Retaining element, retaining lug
12 Cavity
13 End face
14 Siccative
15 Inner side of frame
16 Outer side of frame
17 Opening
18 Connecting element
19 Roof

I claim:

1. A plug connector for making a connection joint between an axially aligned pair of hollow spacer profiles of insulating glass panes, said plug connector being configured as an essentially U-shape cross section with a center web and a pair of side webs extending from said center web to define with said center web a cavity in said plug connector, said plug connector being characterized by a bottom plate extending between said side webs for closing said cavity in and only in the region of said connection joint between said spacer profiles.

2. The plug connector of claim 1 wherein said bottom plate consists at least one lobe bent at an angle from said side webs and pointing towards an inner side of said spacer profiles.

3. The plug connector of claim 1 wherein said plug connector has siccative disposed in said cavity.

* * * * *